(12) United States Patent
Hubbs

(10) Patent No.: US 7,110,194 B2
(45) Date of Patent: Sep. 19, 2006

(54) SPHERICAL RETRO-REFLECTOR MOUNT NEGATIVE

(75) Inventor: William O. Hubbs, Cedar Hill, MO (US)

(73) Assignee: Hubbs Machine & Manufacturing Inc., Cedar Hill, MO (US)

( * ) Notice: Subject to any disclaimer, the term of this patent is extended or adjusted under 35 U.S.C. 154(b) by 0 days.

(21) Appl. No.: 10/704,838

(22) Filed: Nov. 10, 2003

(65) Prior Publication Data

US 2004/0100705 A1 May 27, 2004

Related U.S. Application Data

(60) Provisional application No. 60/429,398, filed on Nov. 27, 2002.

(51) Int. Cl.
G02B 7/02 (2006.01)

(52) U.S. Cl. .................. 359/822; 359/819; 359/198

(58) Field of Classification Search ............ 359/819, 359/822, 169–170, 529, 198, 543, 517–518; 427/163.1, 163.4; 398/169–170; 356/152.3; 362/455; 353/24, 96, 100–101
See application file for complete search history.

(56) References Cited

U.S. PATENT DOCUMENTS

| 5,861,956 | A * | 1/1999 | Bridges et al. | ............. 356/614 |
| 6,299,122 | B1 * | 10/2001 | Bame | ......................... 248/466 |
| 6,765,733 | B1 * | 7/2004 | Igl et al. | ...................... 359/822 |
| 2002/0148133 | A1 * | 10/2002 | Bridges et al. | ............... 33/702 |
| 2004/0035277 | A1 * | 2/2004 | Hubbs | ........................ 83/682 |

* cited by examiner

Primary Examiner—Jordan M. Schwoutz
Assistant Examiner—Jessica Stultz
(74) Attorney, Agent, or Firm—Paul M. Denk

(57) ABSTRACT

A sphere mount for a ball mounted retro-reflector having a perimeter recess and a base shank. The sphere mount is configured to receive a ball mounted retro-reflector in a centrally disposed conical nest, such as a three-point conical nest, and to position it with a high degree of precision over the central axis of the base shank to within ±0.0005 of an inch. The perimeter recess is in the form of a single oblique scallop, orientated from the upper surface to the lower surface, and permits a maximum negative acceptance angle for incident light to a mounted spherical retro-reflector with no occlusion by the sphere mount perimeter.

8 Claims, 3 Drawing Sheets (3) POINT NEST
ON C/L OF
"A" DIAMETER

SPHERICAL RETRO-REFLECTOR MOUNT NEGATIVE

CROSS-REFERENCE TO RELATED APPLICATIONS

This non provisional patent application claims priority to the provisional patent, application having Ser. No. 60/429,398, which was filed on Nov. 27, 2002.

STATEMENT REGARDING FEDERALLY SPONSORED RESEARCH

Not Applicable

BACKGROUND OF THE INVENTION

The present invention relates to mounts for precision optical elements, and in particular, to a spherical retro-reflector three-point conical nest sphere mount, having a negative acceptance angle.

Modern manufacturing technology, particularly that associated with the construction of large composite material structures, requires the contours of components and tooling to be accurately measured and inspected for compliance with design models and specifications. One manner in which these structures are measured is with the aid of portable coordinate measuring machines such as laser trackers.

Laser trackers measure and inspect large components by illuminating one or more retro-reflecting targets mounted to the components in predetermined locations with a laser. The distance between the laser tracker and the retro-reflector target is measured using the laser, and compared with design models or specifications, such as those stored on a computer.

To facilitate the use of laser trackers, retro-reflectors are centrally mounted in hollow steel balls, commonly referred to as Spherically Mounted Retro-reflectors (SMR), which in turn are fitted to the target object in predetermined locations with the use of sphere mounts, such as is shown at in FIG. 1. The hollow steel balls include a circular opening or aperture in an exterior surface, through which laser light enters the ball and is reflected back along an incident angle to the source by the internally mounted retro-reflector. Surrounding the circular opening or aperture is a cylindrical hood, configured to reduce or eliminate unwanted glare and to protect the glass optical retro-reflector from breakage. Each sphere mount is typically cylindrical or disc shaped, and include a recessed conical nest in one surface which holds and locates the retro-reflector ball, usually with the aid of a magnet. The opposite surface of the sphere mount is either flat to within a predetermined tolerance or includes a base shank, configured for seating within a correspondingly sized bore on the target object, permitting the sphere mount to be located at a known position on the target object. For high tolerance applications, a sphere mount having a three-point conical nest, commonly referred to as a kinematic mount, may be utilized.

Conventional sphere mounts such as those shown in FIG. 1 come in a variety of standard sizes, such as 0.500", 0.875", and 1.500" and have a hemispherical range of illumination acceptance, which is generally limited by the mechanical interaction between the edge of the circular opening or aperture in the retro-reflector ball and the upper surface of the sphere mount. FIG. 4 illustrates how the retro-reflector ball in a conventional sphere mount may rotate through a vertical arc of 180° and may rotate 360° about the central axis within the conical nest of the sphere mount.

In some applications, the laser tracker or illumination source may not be disposed within the hemispherical range of illumination acceptance defined by the upper surface of the sphere mount, but rather, slightly below the lower boundary. For these applications, it is known to employ sphere mounts having an axially perpendicular recess between the base of the conical nest and the circumferential perimeter, such as is shown in FIG. 5. Illustrated in phantom in FIG. 5, a retro-reflector ball placed in such a modified sphere mount may rotate through a vertical arc angle greater than 180° when radially aligned with the perpendicular recess, by seating the cylindrical hood within the recess, providing an extending illumination acceptance range.

Vertical arc angles of illumination acceptance from 0° to 180° are considered "positive" angles while vertical arc angles of acceptance greater than 180° (i.e. below the horizon of the sphere base, are considered "negative" angles. However, as can be seen in FIG. 5, a portion of the circular opening or aperture to the ball mounted retro-reflector is occluded by the modified sphere mount, reducing the effective size of the circular opening or aperture and rendering measurement readings more difficult to obtain.

Accordingly, there is a need in the portable precision measurement industry for a modified sphere mount design which will provide a maximum illumination acceptance range for a ball mounted retro-reflector greater than 180°, and which will not occlude the retro-reflective elements and illumination source.

BRIEF SUMMARY OF THE INVENTION

Briefly stated, the present invention is a sphere retro-reflector conical nest mount having a perimeter recess and a base shank. The sphere mount is configured to receive a spherical retro-reflector in a centrally disposed conical nest, and to position it with a high degree of precision over the central axis of the base shank. The perimeter recess is in the form of a single oblique scallop, orientated from the upper surface to the lower surface, and permits a maximum negative acceptance angle for incident light to a mounted spherical retro-reflector with no occlusion by the sphere mount perimeter.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
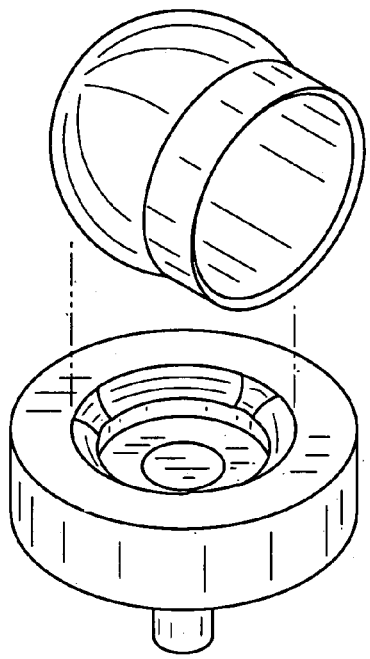
FIG. 1 is an exploded perspective view of a conventional sphere mount and ball mounted retro-reflector.
Figure 2:
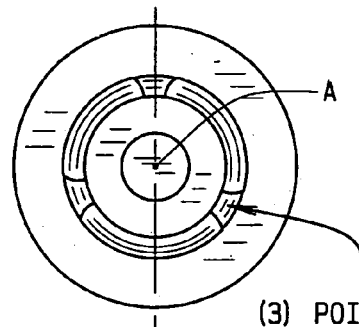
FIG. 2 is a top plan view of the conventional sphere mount of FIG. 1, illustrating a three-point conical nest.
Figure 3:
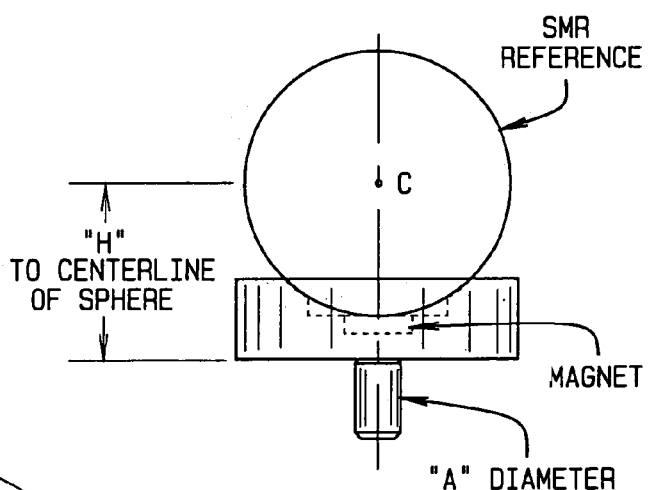
FIG. 3 is a side plan view of the convention sphere mount of FIG. 1, with a seated ball mounted retro-reflector.
Figure 4:
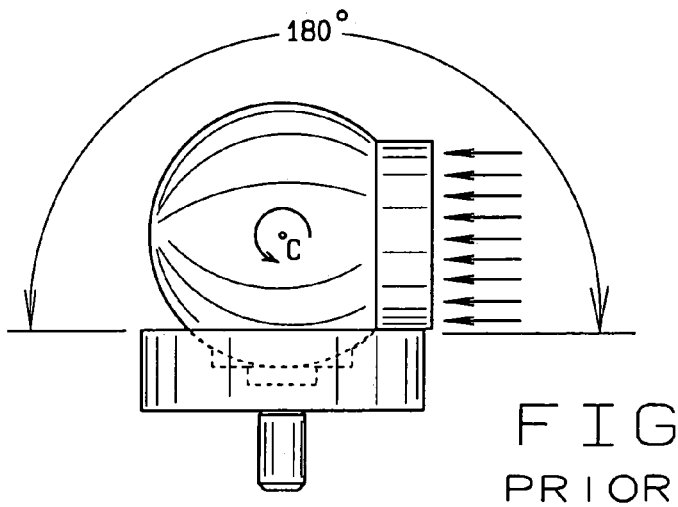
FIG. 4 is a side view of the conventional sphere mount and ball mounted retro-reflector of FIG. 1, illustrating the hemispherical illumination acceptance range.
Figure 5:
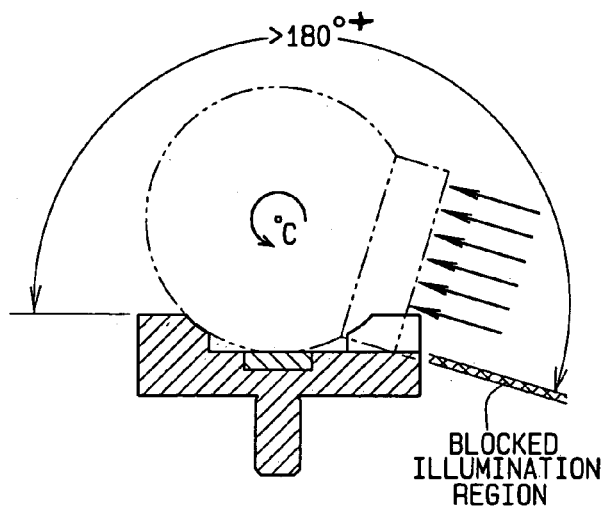
FIG. 5 is a side sectional view of a modified sphere mount and ball mounted retro-reflector, illustrating a negative illumination angle partially occluded by the modified sphere mount structure.
Figure 7:
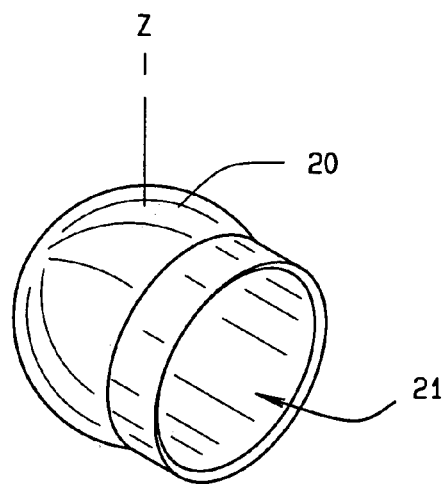
FIG. 7 is a front view of the sphere mount of FIG. 6.
Figure 7:
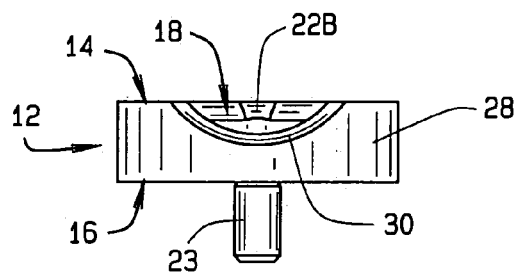
Figure 6:
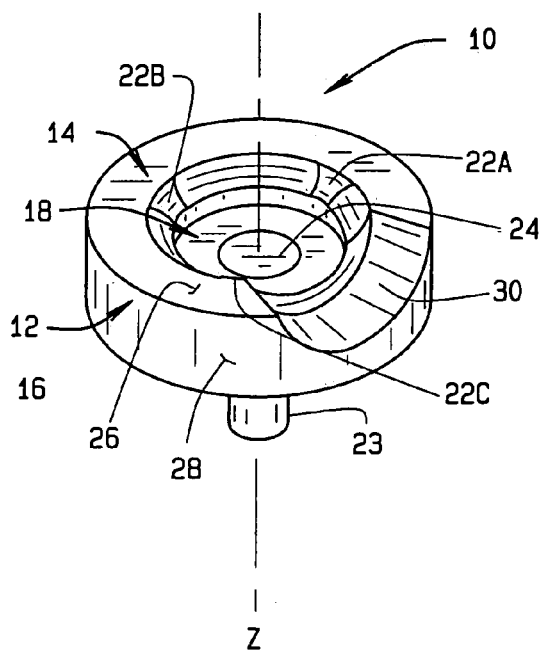
FIG. 6 is an exploded perspective view of the sphere mount of the present invention with a ball mounted retro-reflector.
Figure 8:
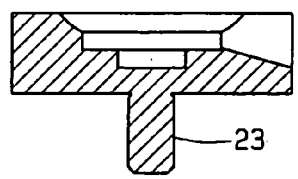
FIG. 8 is a side sectional view of the sphere mount of FIG. 7.

Turning to FIG. 6 through FIG. 8, a sphere mount of the present invention is shown generally at 10. Sphere mount 10 comprises a cylindrical body 12, having an upper surface 14 and a lower surface 16 disposed perpendicular to a central axis Z—Z. A conical nest 18 is disposed in the upper surface 14, and is configured to receive a ball mounted retro-reflector 20 of predetermined diameter, having an circular opening 21 through which incident and reflected light passes. A cylindrical base shank 23 extends perpendicularly from the lower surface 16, concentric with the central axis Z—Z to within a predetermined tolerance. For critical, close tolerance applications, an acceptable tolerance for axial alignment between the central axis Z—Z and said cylindrical base shank is ±0.0005".

To facilitate receiving the ball mounted retro-reflector 20 to within a predetermined tolerance of a predetermined position relative to the lower surface 16 and the central axis Z—Z, the conical nest 18 may include at least three equi-distantly spaced precision formed, contact points 22A—22C which define a seat for the ball mounted. Preferably, the contact points 22A—22C further define the seat for the ball mounted retro-reflector 20 at a predetermined radial distance from about the central axis Z—Z. A magnet 24 optionally disposed at the base of the conical nest 18 aids in seating the ball mounted retro-reflector 20 against the contact points 22A—22C. In an exemplary embodiment of the present invention, a 1.5" diameter ball mounted retro-reflector 20 is seated in the conical nest 18 such that the center point C of the ball lies within +0.0005" of the central axis Z—Z, and is held at a predetermined height value to within +0.0005" above the lower surface 16. Those of ordinary skill in the art will recognize that alternate dimension and tolerances may be utilized depending upon the particular application for the sphere mount and ball mounted retro-reflector.

Figure 9:
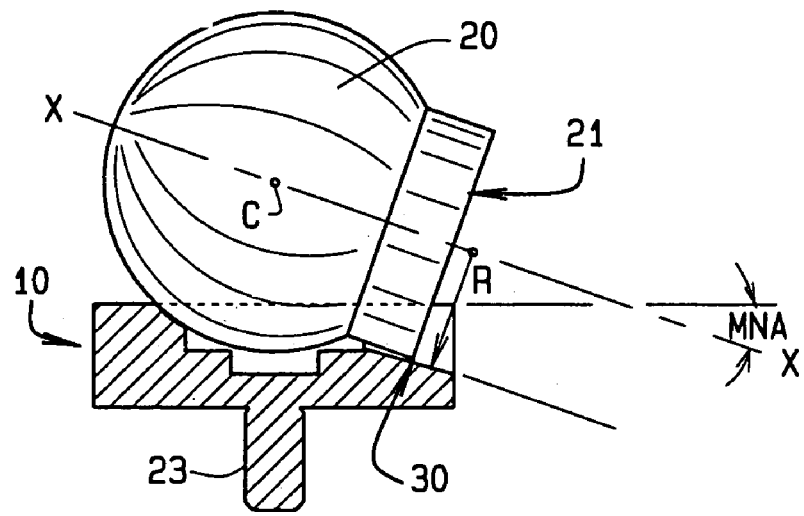
FIG. 9 is a side sectional view similar to FIG. 8, with a ball mounted retro-reflector seated in the conical nest, illustrating the oblique recess parameters.
Figure 10:
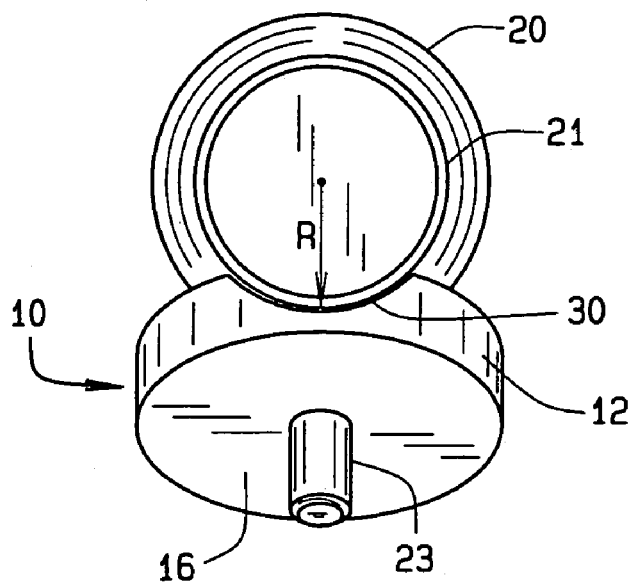
FIG. 10 is a perspective front view of the sphere mount of the present invention, viewed along the retro-reflector axis, with the ball mounted retro-reflector seating in the conical nest, aligned at the maximum negative acceptance angle.

A perimeter 26 is disposed between the conical nest 18 and a circumferential edge 28 of the cylindrical body 12. Formed in the perimeter 26, at least one oblique scallop or channel 30 extends radially outward between a pair of the contact points 22A, 22B (when included) to the circumferential edge 28. As seen in FIG. 9 and FIG. 10, the length of the oblique scallop or channel 30 from the conical nest 18 to the circumferential edge 28 has a uniform radial dimension R which is equal to, or greater than, the radial dimension of the light receiving circular opening or aperture 21 in an associated ball mounted retro-reflector 20.

The uniform radial dimension R over the length of the oblique scallop 30 defines a semi-cylindrical surface having a central axis X—X which passes through the center point C of the ball mounted retro-reflector 20. The semi-cylindrical configuration of the oblique scallop or channel 30 ensures that incident or reflected light entering the aperture 21 perpendicular to the plane of the aperture 21, i.e. parallel to the central axis X—X in a cylindrical or perpendicular field-of-view, and at the maximum negative acceptance angle (MNA) for the sphere mount 10, is not occluded by the perimeter 26.

The maximum negative acceptance angle (MNA) for the sphere mount 10 and ball mounted retro-reflector 20 is delimited by the size of the circular opening or aperture 21 and the parameters of the conical nest 18. Specifically, the ball mounted retro-reflector 20 can only be rotated within the conical nest 18 to a negative acceptance angle at which the circumferential edge of the aperture 21 contacts two of the three contact points 22A—22C. Further rotation, assuming no interference with any cylindrical hood present, would place one of the contact points 22A—22C within the circular opening or aperture 21, resulting in an unstable mounting for the ball mounted retro-reflector 20 on the remaining two nest points in contact with the surface of the ball.

Those of ordinary skill in the art will recognize that the sphere mount 10 may be constructed with or without the base shank 1.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An optical element mount for a ball mounted retro-reflector having an apex of the retro-reflector aligned with the absolute center of the ball and a circular aperture in the surface of the ball, said optical element mount configured to seat said ball mounted retro-reflector in a conical nest;

said optical element mount located below said ball mounted retro-reflector and configured to permit said ball mounted retro-reflector to orient within said conical nest to a maximum negative illumination acceptance angle below an upper surface of said optical element mount, said negative illumination acceptance angle delimited by said conical nest and said ball mounted retro-reflector; and said optical element mount further configured to permit unimpeded light acceptance to said ball mounted retro-reflector at said delimited negative illumination acceptance angle.

2. The optical element mount of claim 1 further configured to permit unimpeded light acceptance to said ball mounted retro-reflector at said delimited negative illumination acceptance angle in a cylindrical field of view.

3. The optical element mount of claim 2 wherein said cylindrical field of view has a radius corresponding to a radial dimension of said circular aperture.

4. The optical element mount of claim 1 further configured to permit unimpeded light acceptance to said ball mounted retro-reflector at said delimited negative illumination acceptance angle in a field of view perpendicular to said circular aperture.

5. The optical element mount of claim 1 further configured to seat said ball mounted retro-reflector in said conical nest at a predetermined position to within a predetermined tolerance.

6. The optical element mount of claim 1 including a base shank being generally perpendicular to the lower surface and axially aligned with said conical nest to within a predetermined tolerance.

7. The optical element mount of claim 1 wherein said conical nest is a three-point conical nest.

8. An improved optical element mount having a solid cylindrical base with a central axis, an upper surface, and a lower surface, a conical nest axially disposed in an upper surface of said base, and a portion of said upper surface disposed between said conical nest and a circumferential edge of said cylindrical base, said portion defining a perimeter, the improvement comprising:

at least one oblique scallop of uniform radius into and partially along said perimeter, said oblique scallop extending radially from said conical nest to said circumferential edge, defining an unimpeded cylindrical field of view along a maximum negative acceptance angle relative to said upper surface.

* * * * *